L. W. Boynton,
Making Skewers.
No. 53,108. Patented Mar. 13, 1866.
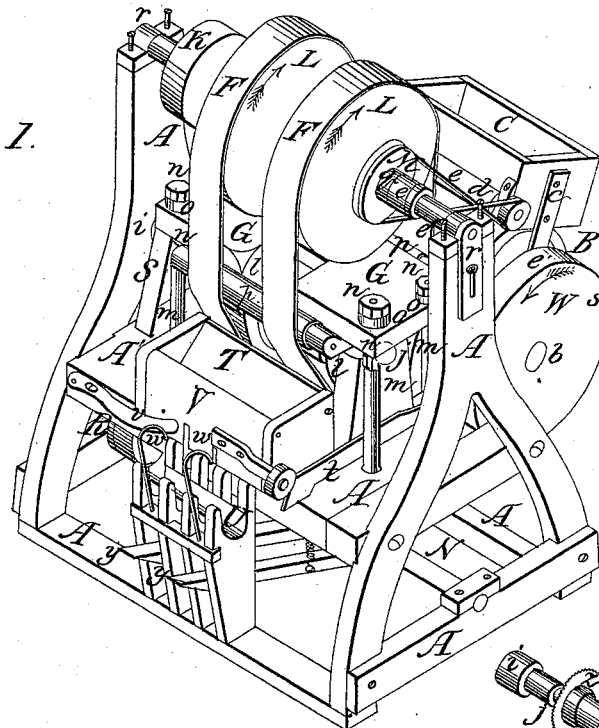
Fig. 1.
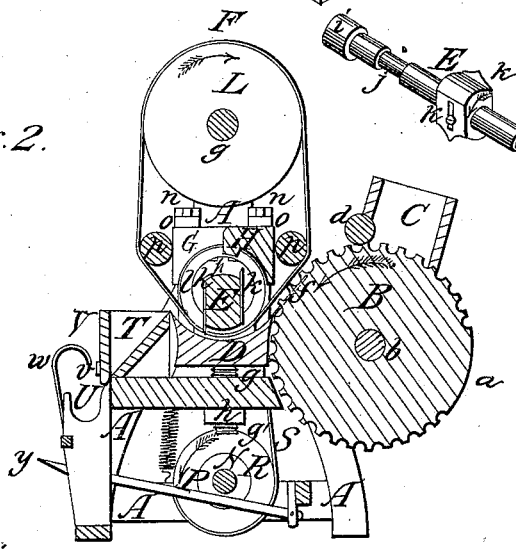
Fig. 2.
Fig. 3.
Fig. 4.
Fig. 5.
Witnesses:
Jas. A. Austin
R. Fitzgerald
Inventor.
L. W. Boynton

UNITED STATES PATENT OFFICE.

LEANDER W. BOYNTON, OF HARTFORD, CONNECTICUT.

IMPROVEMENT IN MACHINES FOR POINTING SKEWERS.

Specification forming part of Letters Patent No. 53,108, dated March 13, 1866.

*To all whom it may concern:*

Be it known that I, LEANDER W. BOYNTON, of the city and county of Hartford, in the State of Connecticut, have invented a new and useful Improvement in Machinery for Counting and Pointing Skewers, &c.; and I do hereby declare that the following is a full, clear, and exact description of the construction, character, and operation of the same, reference being had to the accompanying drawings, which make part of this specification, in which—

Figure 1 is a perspective view of the whole machine ready for use. Fig. 2 is a section of the same cut vertically through the center at right angles to the cutter-shaft, showing the relative positions of the several parts. Fig. 3 is a perspective view of the cutter-shaft with one form of cutters for sharpening the skewers and cutting them apart. Fig. 4 is a perspective view of the cutter-shaft with a different form and arrangement of cutters for the same purpose, and also showing a pair of circular saws for cutting off the outer ends of the stick, so that all the skewers may be of the same length. Fig. 5 is a section of Fig. 4 cut at right angles to the shaft through the cutters.

My improvement consists in making the machine with a grooved cylinder to receive and count the sticks and to convey them away to be pointed, and in an apparatus for pointing the sticks or skewers, and in fitting a reservoir to receive the finished skewers as they come from the pointing apparatus and retain them till the count is completed, when it will discharge them into a trough, where, by the operation of hooks worked by treadles, they are held ready for tying up in bundles ready for packing for market.

I make the frame of cast-iron or any other suitable material, substantially in the form shown at A A', &c., and indicated in part in Fig. 2. I make the grooved receiving and counting cylinder of cast-iron, or any other suitable material, in the form indicated at B, Fig. 2, and as shown in its position at B, Fig. 1. I make the length of this cylinder at least twice the length of the skewer. I make the grooves nearly of the whole length of the cylinder, and have them cover about five-sixths of the convex surface, leaving about one-sixth plain, as shown at $a$, Fig. 2; and I make each groove of sufficient capacity to receive and carry one stick suitable to make two skewers, and when I intend to put them up in bundles of one hundred each I make about ninety-five grooves; and I have the journals of its arbor or axis $b$, Fig. 2, work in suitable bearings, (one end of its arbor extending to $b$, Fig. 1.) Above this grooved or counting cylinder I fit a suitable receiver or hopper, as shown at C, Fig. 1, and indicated in section at C, Fig. 2, (which I support with standards, one of which is shown at $c$,) to receive the sticks (twice the length of the skewers) and deliver them into the grooves in the grooved cylinder; and along the inner lower corner of this receiver or hopper I fit a small roller, as shown at $d$, Fig. 1, and indicated in section at $d$, Fig. 2, which I revolve by means of a crossed belt, $e$, Fig. 1, or otherwise, to prevent any stick rising out of the groove as it passes by the edge of the hopper, and also to prevent more than one stick being carried forward by any one groove to derange the count or to clog or interrupt the pointing apparatus.

In the central part of the machine, and above the main bed-plate A' A', I fit a block, D, with its upper surface concave to form the lower portion of the shell of the pointing apparatus, to which I attach two flat springs to pass upward onto the smooth portion of the periphery at each end of the grooved cylinder, one of which is shown at $f$, Fig. 2, to raise the sticks out of the grooves and guide them into the shell. I support this block D or lower part of the shell by two adjusting-screws, one of which is shown at $g$ $g'$, on each of which I place a nut, as shown at $h$, below the bed-plate A', and another above the bed-plate, which is omitted in the drawings to show the screw at $g$, Fig. 2, by means of which I elevate or depress the block D, so as to adjust the concave surface to the belts, cutters, &c., above it.

I make the cutter-shaft of cast-steel or any other suitable material, substantially of the shape or form shown in Fig. 3, and its central part through the cutters indicated in cross-section at E, Fig. 2, or I make the cutter-shaft substantially of the form shown in Fig. 4, and in cross-section cut through the cutters in Fig. 5, making one cutter, $k$, Figs. 4 and 5, to cut down the center and finally to cut the two skewers apart, and two cutters like $k'$, Figs. 4 and 5, to chamfer off or bevel down the pointed ends of the skewers, which I deem a better form and arrangement of the cutters than that shown in Fig. 3, and at the proper distance from the cutters to suit the length of the skewers I fit two circular saws, $z$ and $z'$, Fig. 4, for the purpose of cutting off the ends of the sticks, so that all of the skewers may be of the same length. I suspend this cutter-shaft in suitable bearings, as indicated by its journals at $j$ and $j$, Figs. 3 and 4, and $j$, Fig. 1.

I make the cutters of cast-steel, substantially of the shape shown at $k$ and $k'$ in Fig. 3 or in Fig. 4, and I secure them to the shaft by means of binding-screws inserted in slots, as indicated at $k'$, Fig. 3, or at $k$ and $k'$ in Fig. 4, Fig. 4 being deemed preferable.

I make two short hollow cylinders or hoops, as shown at $l$ and $l$, Fig. 1, and indicated in section at $l$, Fig. 2, of much larger caliber, so as to work loosely around the cutter-shaft, and have each of them worked by a belt, as F and F, Fig. 1, and as shown in section in Fig. 2, where they work within the concave surface of the block D, so near that the belts F and F will press upon and roll the sticks to the position where the cutters $k$ and $k'$, Figs. 3 or 4, will sharpen and separate them.

Above the two hollow cylinders or hoops I place an adjustable cap-piece, as G G, Fig. 1, and G, Fig. 2, in the under side of which I make a longitudinal semicircular space in which the cylinders or hoops work, as shown in section in Fig. 2, and in the central part of it I fit a suitable block or guide, as H, Fig. 2, to steady the cylinders $l$ and $l$ in their places. I secure this cap-piece G G by means of four upright screw-bolts or pillars, three of which are shown at $m$ $m$ and $m$, Fig. 1, which I secure and adjust by nuts, as $n$ $n$, &c., placed above and below the cap-piece, and under each of the upper nuts, $n$ $n$, &c., I place a piece of india-rubber, as indicated at $o$ $o$, &c., to allow a slight yielding of the cap-piece when necessary. On each side of this cap-piece I fit a small roller, as $p$ and $p$, Figs. 1 and 2, to keep the belts F and F in their proper position to operate on the skewer-sticks to revolve and carry them, as before described. Above this cap-piece G G, I fit an arbor or shaft, $q$, which I support in adjustable bearings, as shown at $r$ and $r$, Fig. 1. This shaft is to be driven by the main power with a belt on the pulley K, which will revolve the two pulleys L and L, which carry the belts F and F, and on the same arbor, $q$, I fit a small pulley, M, which, by means of the crossed belt $e$, revolves the roller $d$, and by means of the crossed belt $e'$, running on the shaft at $q$, and the wheel or disk W, revolves the grooved cylinder B.

In the lower part of the frame I fit a shaft, N, Figs. 1 and 2, which carries a driving-pulley, (indicated at P, Fig. 2,) and a pulley, R, on which the belt S, Figs. 1 and 2, works to revolve the cutter-shaft, as indicated at $i$, Fig. 1. On the side opposite the grooved cylinder B, I fit a triangular receiver, as T, Figs. 1 and 2, of sufficient length to receive two lengths of the skewers as they come from the pointing apparatus, and of sufficient capacity to contain about one hundred skewers in each length, so that it will receive all that the grooved cylinder B will bring forward by one revolution; and when this receiver is thus full a pin or projection on the inner side or surface of the wheel or disk W, which is not seen, but its position is indicated by dots at $s$, will depress the inner end of the vibratory lever $t$, and raise the lower edge of the swinging front piece V sufficiently to discharge all of the skewers into the trough U, when the spring $v$ will instantly close the swinging front V to receive more, and the two hooks $w$ and $w$ may be brought down by the two treadles $y$ and $y$, to hold the skewers close while tying up the bundles for market, &c.

Having made and arranged the several parts as before described, I put the machine in motion by means of one driving-belt on the pulley K, Fig. 1, and another on the pulley indicated at P, Fig. 2, and having the sticks prepared (by a machine described in another application) I feed them into the receiver C, Figs. 1 and 2, by their own gravity. By the motion (in the direction indicated by the dart) of the grooved cylinder B and the opposite revolving of the small roller $d$, one stick will fall into each groove, and will be carried onward until the flat springs $f$, Fig. 2, lift the sticks out of the grooves, when the belts F F will roll the sticks along on the concave surface of the block D, and the cutters $k$ and $k'$, Figs. 3 or 4, by striking the central part of each stick, will taper it down to two points and cut it apart in the middle, so as to make two sharpened and completely finished skewers, and the belts F and F will continue to roll the finished skewers on the concave bed or shell until they fall over into the reservoir or receptacle T; and when the blank part $a$ of the grooved cylinder B (where it will not deliver any sticks) arrives at the block D the pin (whose locality is indicated by the dots at $s$ on the wheel or disk W) will strike the inner end of the vibrating lever $t$ and swing out the lower edge of the front piece, V, of the reservoir or receptacle T and discharge the finished skewers into the trough U, when, by pressing down the pedals $y$ and $y$, the hooks $w$ and $w$ will hold the two bundles of skewers in a position to be tied up with twine or otherwise; and when so tied up I insert some five or six skewers into each bundle to tighten the ligature, when the bundles will be ready to be packed for market.

For pointing long skewers I make the machine single, or substantially like one-half of that before described, as though it was cut through the center, as represented in Fig. 2, but making each part perfect in itself, and of sufficient length to receive, convey, point, and deliver one skewer, pointed at one end, of the desired length, in which case I may make the one short cylinder *l* solid, and I may fit it on a shaft, so that I may dispense with the upper portion, G, of the concave shell and the pulley L and belt F, as these parts will not be needed in the same way in the single as in the double machine, as first described.

I claim—

The cutters *k* and *k'*, Figs. 3 or 4, in combination with the concave bed-piece D, cap-piece G G, and cylinders *l l*, when they are constructed, combined, and operated substantially as herein described and set forth.

L. W. BOYNTON.

Witnesses:
R. FITZGERALD,
JAS. A. AUSTIN.